(12) United States Patent
Cho et al.

(10) Patent No.: US 12,496,716 B2
(45) Date of Patent: Dec. 16, 2025

(54) METHOD AND APPARATUS FOR CONTROLLING SERVING ROBOT BASED ON INFORMATION FROM TABLE

(71) Applicant: ELECTRONICS AND TELECOMMUNICATIONS RESEARCH INSTITUTE, Daejeon (KR)

(72) Inventors: Mi-Young Cho, Daejeon (KR); Woo-Han Yun, Daejeon (KR); Min-Su Jang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 115 days.

(21) Appl. No.: 18/393,883

(22) Filed: Dec. 22, 2023

(65) Prior Publication Data
US 2025/0121499 A1    Apr. 17, 2025

(30) Foreign Application Priority Data

Oct. 11, 2023  (KR) .......................... 10-2023-0135176

(51) Int. Cl.
| | |
|---|---|
| *B25J 9/16* | (2006.01) |
| *B25J 5/00* | (2006.01) |
| *B25J 11/00* | (2006.01) |
| *B25J 13/00* | (2006.01) |
| *B25J 13/08* | (2006.01) |
| *G06Q 50/12* | (2012.01) |

(52) U.S. Cl.
CPC ............. *B25J 9/1664* (2013.01); *B25J 5/00* (2013.01); *B25J 9/1661* (2013.01); *B25J 11/0045* (2013.01); *B25J 11/008* (2013.01); *B25J 13/006* (2013.01); *B25J 13/08* (2013.01); *G06Q 50/12* (2013.01)

(58) Field of Classification Search
CPC . B25J 9/1664; B25J 5/00; B25J 9/1661; B25J 11/0045; B25J 11/008; B25J 13/006; B25J 13/08; G06Q 50/12
See application file for complete search history.

(56) References Cited

U.S. PATENT DOCUMENTS

| | | | |
|---|---|---|---|
| 8,660,693 B2 | 2/2014 | Suh et al. | |
| 9,492,922 B1 * | 11/2016 | Johnson | ............... G05D 1/0297 |
| 10,852,745 B2 | 12/2020 | Jeon et al. | |
| 11,062,610 B1 * | 7/2021 | Brendible | ............... H04W 4/44 |

(Continued)

FOREIGN PATENT DOCUMENTS

| | | |
|---|---|---|
| KR | 10-2011-0011235 A | 2/2011 |
| KR | 10-2021-0017981 A | 2/2021 |

(Continued)

*Primary Examiner* — Sohana Tanju Khayer
(74) *Attorney, Agent, or Firm* — LRK PATENT LAW FIRM

(57) ABSTRACT

Disclosed herein is a method for controlling a serving robot based on meal context. The method includes receiving table information from a table robot corresponding to each table in a service area and controlling driving of a serving robot using the meal context and a navigation map, and the meal context includes information about the seating positions of customers and meal status information corresponding to the table.

16 Claims, 12 Drawing Sheets

(56) References Cited

U.S. PATENT DOCUMENTS

| | | | |
|---|---|---|---|
| 11,093,795 | B2 | 8/2021 | Chae et al. |
| 11,429,113 | B2* | 8/2022 | Lee ................... B25J 9/1697 |
| 11,775,983 | B2 | 10/2023 | Yim et al. |
| 2015/0339923 | A1* | 11/2015 | König .................. H04L 67/12 |
| | | | 709/219 |
| 2017/0101054 | A1* | 4/2017 | Dusane ............ G08G 1/096741 |
| 2020/0130197 | A1* | 4/2020 | Roh ..................... B25J 9/161 |
| 2021/0116582 | A1* | 4/2021 | Krause .................. G06N 7/01 |
| 2021/0174370 | A1* | 6/2021 | Yim ................ G06Q 10/06316 |
| 2021/0365046 | A1* | 11/2021 | Sohn ................... G05D 1/0297 |
| 2022/0063107 | A1* | 3/2022 | Cha ..................... B25J 9/1679 |
| 2022/0134561 | A1* | 5/2022 | Graham ................. B25J 9/1676 |
| | | | 700/245 |
| 2022/0215691 | A1* | 7/2022 | Kose Cihangir .. G08B 21/0469 |
| 2022/0410649 | A1* | 12/2022 | Koo ..................... G05D 1/245 |
| 2023/0016435 | A1 | 1/2023 | Ha |
| 2023/0095636 | A1* | 3/2023 | Jeong ................... G09F 19/18 |
| | | | 701/24 |
| 2023/0390929 | A1* | 12/2023 | Fujisawa ............... B25J 9/1664 |
| 2024/0066702 | A1* | 2/2024 | Norrlöf ................. B25J 9/1674 |
| 2024/0139968 | A1* | 5/2024 | Wise ..................... B25J 13/006 |
| 2025/0178511 | A1* | 6/2025 | Jeong ................... B25J 11/008 |

FOREIGN PATENT DOCUMENTS

| | | |
|---|---|---|
| KR | 10-2021-0072588 A | 6/2021 |
| KR | 10-2259429 B1 | 6/2021 |
| KR | 10-2023-0013589 A | 1/2023 |

\* cited by examiner

| TABLE ID | SERVICE REQUEST | START OF SERVICE | END OF SERVICE | SERVING ROBOT ID |
|---|---|---|---|---|
| T1 | 00:00 | 00:00 | | S1 |
| T2 | 00:00 | 00:00 | | S2 |
| T3 | 00:00 | | | |
| T4 | 00:00 | 00:00 | | S3 |

METHOD AND APPARATUS FOR CONTROLLING SERVING ROBOT BASED ON INFORMATION FROM TABLE

CROSS REFERENCE TO RELATED APPLICATION

This application claims the benefit of Korean Patent Application No. 10-2023-0135176, filed Oct. 11, 2023, which is hereby incorporated by reference in its entirety into this application.

BACKGROUND OF THE INVENTION

1. Technical Field

The present disclosure relates to technology for controlling a serving robot based on information collected from a table.

2. Description of Related Art

Recently, with the advancement in artificial intelligence (AI) technology, service robots are being commonly used not only in professional domains but also in everyday life. Especially in a restaurant domain, the use of service robots, such as serving robots, is increasing, and such service robots are being applied not only to delivery but also to various services such as customer interaction. In the restaurant domain, a robot service may provide a solution to a manpower shortage, and the scope of the use of the robot service is expected to further expand as the demand for contactless services increases due to COVID-19.

Existing commonly used serving robots provide services to users by moving along a preset route and locations. The serving robots move at a constant speed over the entire route or slow down to a predefined speed only in specific sections in which deceleration is required, such as a corner or a stepped floor. However, moving along the same route at a constant speed is not efficient from the point of view of restaurant managers, and is not effective to provide personalized services to customers, and this results in a decrease in user satisfaction.

In the present disclosure, meal context is understood by recognizing the seating positions of customers and the progress of a meal at each table using the camera of a table robot, and the driving path, the arrival point, and the movement speed of a serving robot are controlled depending on table status based on the meal context, whereby personalized serving services may be provided and efficient restaurant management may be enabled.

DOCUMENTS OF RELATED ART (Patent Document 1) Korean Patent No. 10-2259429, titled "Artificial intelligence server and method for determining deployment area of robot".

SUMMARY OF THE INVENTION

An object of the present disclosure is to control a serving robot using information acquired from a table robot.

Specifically, an object of the present disclosure is to control the driving path and speed of a serving robot and calculate an estimated service time using information about the seating of customers, meal context information, and the like acquired from a table robot.

In order to accomplish the above objects, a method for controlling a serving robot based on meal context according to an embodiment of the present disclosure includes receiving table information from a table robot corresponding to each table in a service area and controlling driving of a serving robot using the meal context and a navigation map. The meal context includes information about a seating position of a customer and meal status information corresponding to the table.

Here, the meal status information may be classified into before a meal, during a meal, and an end of a meal.

Here, controlling the driving of the serving robot may comprise controlling the serving robot at a second driving speed near the seating position of the customer using the information about the seating position, the second driving speed being lower than an existing first driving speed.

Here, controlling the driving of the serving robot may comprise controlling the serving robot at a fourth driving speed lower than an existing third driving speed when the serving robot carries food.

Here, controlling the driving of the serving robot may comprise, when a request for a table clearing service is received from a table at which a meal is finished, controlling a serving robot located within a preset distance from the table requesting the table clearing service to provide the table clearing service when a distance between a serving robot waiting position in the service area and the table requesting the table clearing service is greater than a threshold.

Here, controlling the driving of the serving robot may comprise setting a driving path to circumvent a table at which another serving robot is providing a service.

Here, controlling the driving of the serving robot may comprise setting the arrival point of the serving robot in consideration of the information about the seating position of the customer.

Here, controlling the driving of the serving robot may include calculating an estimated time of a service for a table in the service area using the meal status information.

Here, controlling the driving of the serving robot may comprise calculating an estimated service completion time of the serving robot and scheduling the serving robot using the estimated service completion time of the serving robot and the estimated time of the service for the table in the service area.

Also, in order to accomplish the above objects, an apparatus for controlling a serving robot based on meal context according to an embodiment of the present disclosure includes a communication unit for receiving table information from a table robot corresponding to each table in a service area and a driving control unit for controlling driving of a serving robot using the meal context and a navigation map. The meal context includes information about a seating position of a customer and meal status information corresponding to the table.

Here, the meal status information may be classified into before a meal, during a meal, and an end of a meal.

Here, the driving control unit may control the serving robot at a second driving speed near the seating position of the customer using the information about the seating position, the second driving speed being lower than an existing first driving speed.

Here, the driving control unit may control the serving robot at a fourth driving speed lower than an existing third driving speed when the serving robot carries food.

Here, when a request for a table clearing service is received from a table at which a meal is finished, the driving control unit may control a serving robot located within a preset distance from the table requesting the table clearing service to provide the table clearing service when a distance between a serving robot waiting position in the service area and the table requesting the table clearing service is greater than a threshold.

Here, the driving control unit may set a driving path to circumvent a table at which another serving robot is providing a service.

Here, the driving control unit may set the arrival point of the serving robot in consideration of the information about the seating position of the customer.

Here, the driving control unit may calculate an estimated time of a service for a table in the service area using the meal status information.

Here, the driving control unit may calculate an estimated service completion time of the serving robot and schedule the serving robot using the estimated service completion time of the serving robot and the estimated time of the service for the table in the service area.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
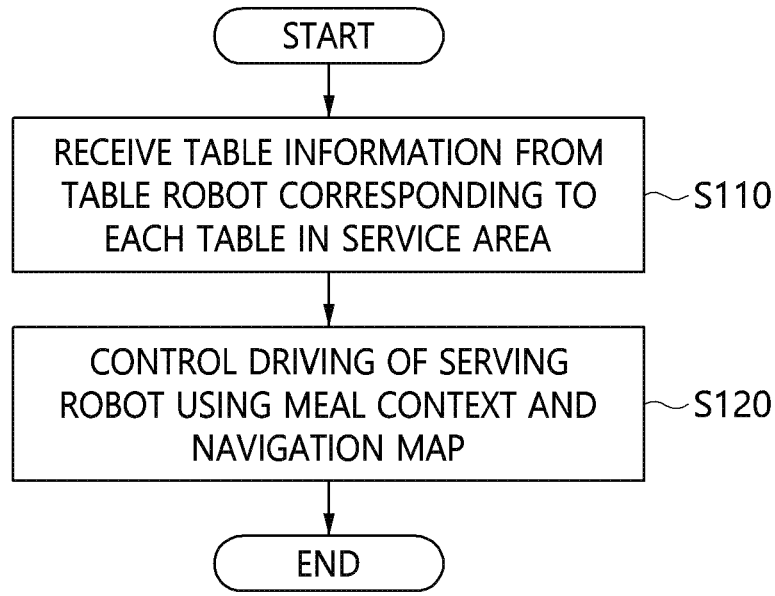
FIG. 1 is a flowchart illustrating a method for controlling a serving robot based on meal context according to an embodiment of the present disclosure.

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

In the present specification, each of expressions such as "A or B", "at least one of A and B", "at least one of A or B", "A, B, or C", "at least one of A, B, and C", and "at least one of A, B, or C" may include any one of the items listed in the expression or all possible combinations thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

FIG. 1 is a flowchart illustrating a method for controlling a serving robot based on meal context according to an embodiment of the present disclosure.

The method for controlling a serving robot based on meal context according to an embodiment of the present disclosure may be performed by a serving robot control apparatus, such as a computing device or a server.

Referring to FIG. 1, the method for controlling a serving robot based on meal context according to an embodiment of the present disclosure includes receiving table information from a table robot corresponding to each table in a service area at step S110 and controlling driving of a serving robot using the meal context and a navigation map at step S120, and the meal context includes information about the seating positions of customers and meal status information corresponding to the table.

The meal status information may be classified into before a meal, during a meal, and the end of a meal.

Here, controlling the driving of the serving robot at step S120 may comprise controlling the serving robot at a second driving speed near the seating positions of the customers using the information about the seating positions, the second driving speed being lower than an existing first driving speed.

Here, controlling the driving of the serving robot at step S120 may comprise controlling the serving robot at a fourth driving speed lower than an existing third driving speed when the serving robot carries food.

Here, controlling the driving of the serving robot at step S120 may comprise, when a request for a table clearing service is received from a table at which a meal is finished, controlling a serving robot located within a preset distance from the table requesting the table clearing service to provide the table clearing service when the distance between a serving robot waiting position in the service area and the table requesting the table clearing service is greater than a threshold.

Here, controlling the driving of the serving robot at step S120 may comprise setting the driving path to circumvent a table at which another serving robot is providing a service.

Here, controlling the driving of the serving robot at step S120 may comprise setting the arrival point of the serving robot in consideration of the information about the seating positions of the customers.

Here, controlling the driving of the serving robot at step S120 may include calculating the estimated time of a service for a table in the service area using the meal status information.

Here, controlling the driving of the serving robot at step S120 may comprise calculating the estimated service completion time of the serving robot and scheduling the serving robot using the estimated service completion time of the serving robot and the estimated time of the service for the table in the service area.

Figure 2:
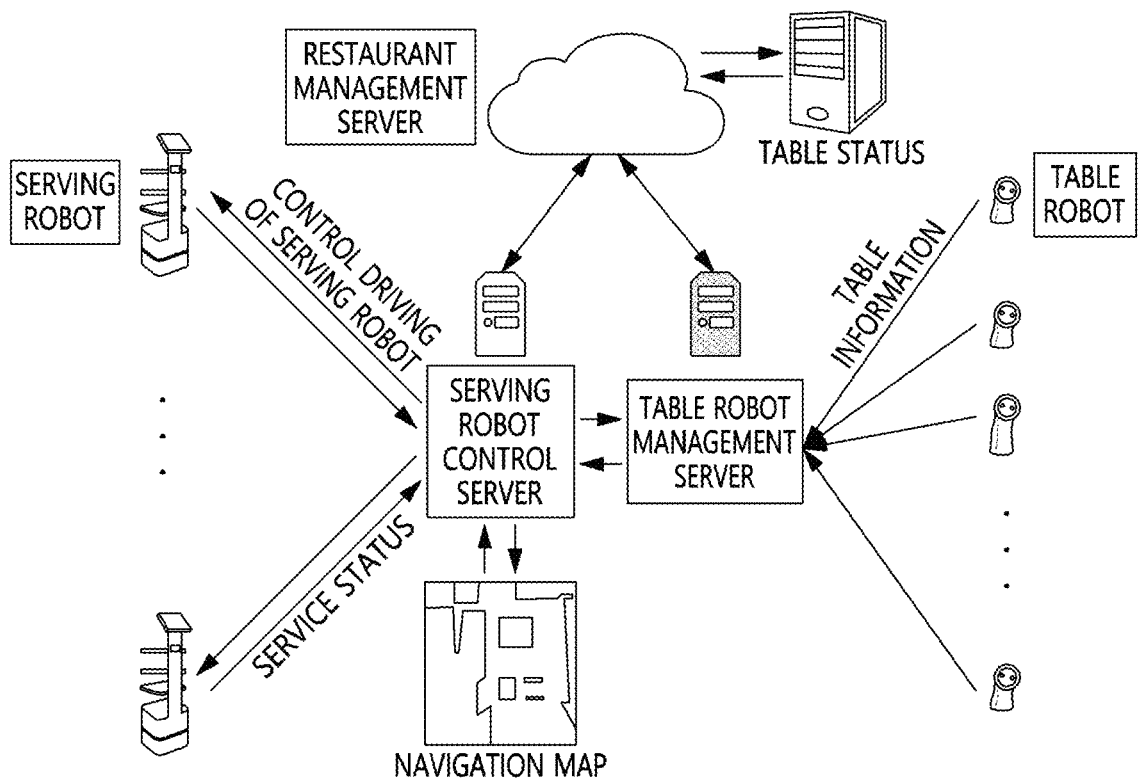
FIG. 2 illustrates the configuration of a system for controlling a serving robot based on technology for understanding meal context.

FIG. 2 illustrates the configuration of a system for controlling a serving robot based on technology for understanding meal context.

The present disclosure relates to a method and system for controlling multiple serving robots based on technology for recognizing meal context, such as customers' seating states, meal status, and the like based on images input from multiple table robots in a restaurant domain.

Referring to FIG. 2, the system for controlling a serving robot according to an embodiment of the present disclosure may include a serving robot, a table robot, a serving robot control server, a table robot management server, and a restaurant management server.

Here, the serving robot control server, the table robot management server, and the restaurant management server may be operated as a single integrated server, or may be configured as different servers that are separately located.

Also, the serving robot control server and the table robot management server are configured as edge servers, and the restaurant management server may be configured to have a hierarchical structure by being configured as a cloud server.

Here, the table robot may include a camera, and it may be embodied as a camera rather than in the form of a robot.

In the method according to an embodiment of the present disclosure, the seating of customers (the number of customers and the positions) is detected and the meal status (before a meal, during the meal, or the end of the meal) is recognized through images input from the camera of the table robot installed in each table in the restaurant domain, whereby meal context may be understood.

Here, the table robot may transmit the recognized meal context information to the table robot management server. The restaurant management server may detect the table status by receiving the meal context information from each table robot and transmit the table status to the serving robot control server. The serving robot control server may update a navigation map based on the table status in the restaurant. Also, the serving robot control server may transmit information for controlling a driving path, a location, and a speed to the serving robot based on the updated navigation map.

The serving robot may start driving for providing a service based on the driving information received from the serving robot control server. The serving robot may transmit a message to the serving robot control server when it finishes a delivery service or a table clearing service. The serving robot control server may update the navigation map based on the message transmitted by the serving robot. Also, the serving robot control server may transmit a serving service completion message to the restaurant management server. When it receives the service completion message, the restaurant management server may update the table status information.

Hereinafter, a method for controlling a serving robot according to various embodiments of the present disclosure will be described in detail.

Figure 3:
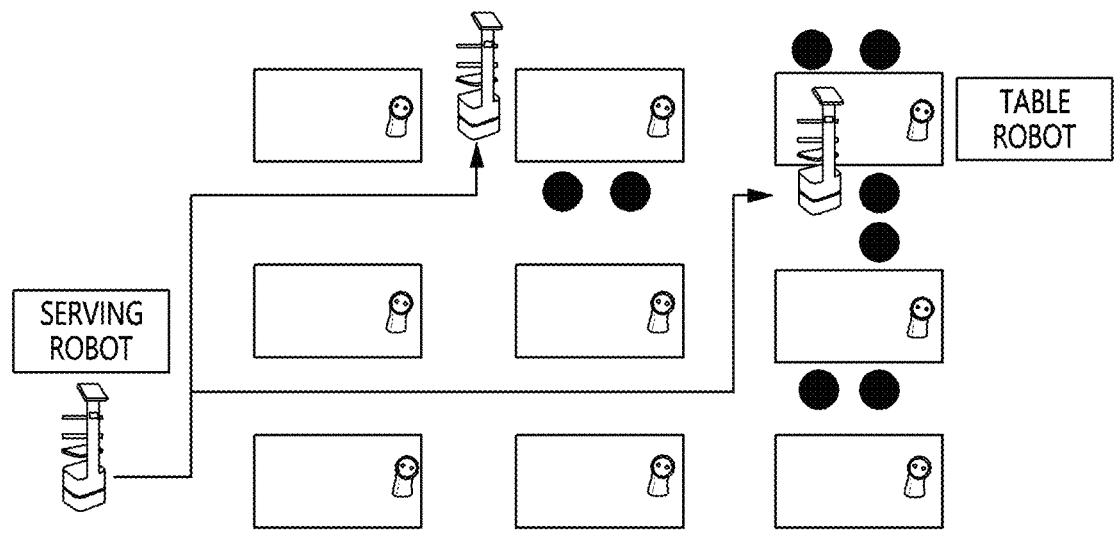
FIG. 3 illustrates a method for controlling the driving path of a serving robot according to an embodiment of the present disclosure.

FIG. 3 illustrates a method for controlling the driving path of a serving robot according to an embodiment of the present disclosure.

Referring to FIG. 3, a table robot located on each table may provide the seating state of customers (whether the customers sit at the table) and seating position information. According to an embodiment, the table robot may transfer information about the seating state of the customers and the seating position information to a serving robot directly or via a management server.

Using the received information, an apparatus for controlling driving of a serving robot (server) may set the driving path and arrival point of the serving robot depending on the information about the seating positions of the customers.

In the method for setting the driving path, the driving path is set to the shortest driving path by default, but may be set to circumvent a table at which another serving robot is providing a delivery service.

Figure 4:
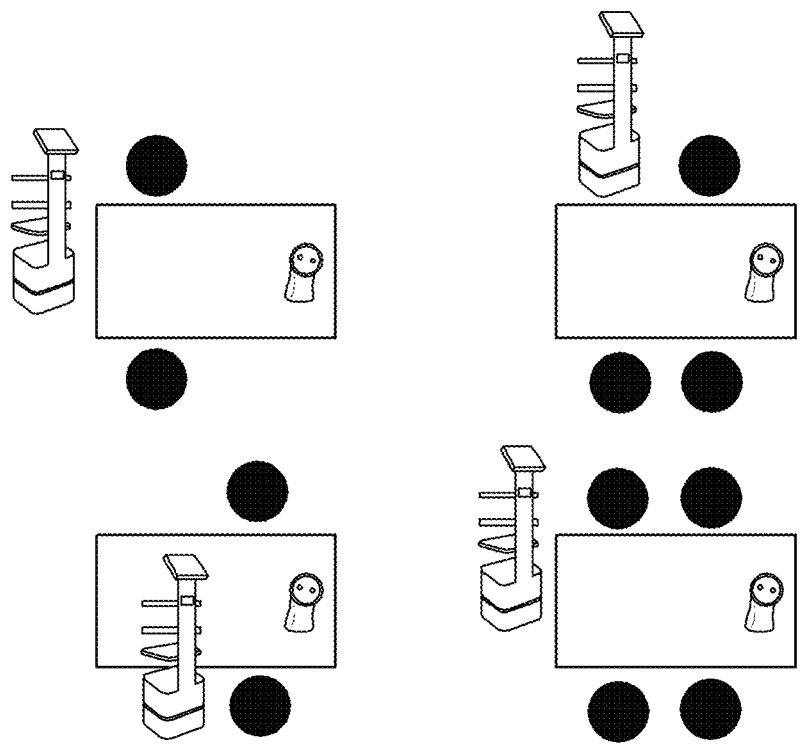
FIG. 4 illustrates a method for controlling the arrival point of a serving robot according to an embodiment of the present disclosure.

FIG. 4 illustrates a method for controlling the arrival point of a serving robot according to an embodiment of the present disclosure.

Referring to FIG. 4, the arrival point of a serving robot is set in consideration of the seating positions of customers at a table. Specifically, the distances from the expected arrival point of the serving robot to all of the customers at the table are estimated, and the point at which the sum of the distances is minimized may be set as the arrival point.

Figure 5:
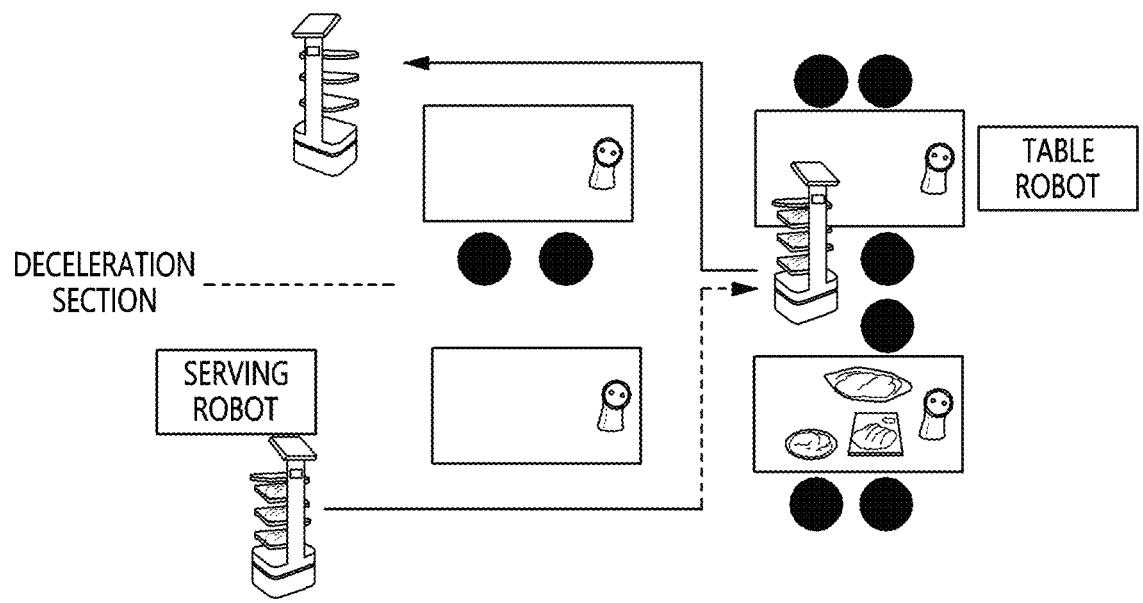
FIG. 5 illustrates a method for controlling the driving speed of a serving robot according to an embodiment of the present disclosure.

FIG. 5 illustrates a method for controlling the driving speed of a serving robot according to an embodiment of the present disclosure.

In the method according to an embodiment of the present disclosure, the driving speed of a serving robot may be controlled depending on whether a customer sits at a table. For example, the speed of the serving robot may decrease near a table at which a customer is having a meal.

Also, in the method according to an embodiment of the present disclosure, the driving speed of the serving robot may be controlled depending on whether the serving robot has food to deliver. For example, when it carries food to deliver, the serving robot moves at low speeds, but when it returns after the delivery, it moves at a normal driving speed.

Alternatively, the serving robot may be controlled to slow down the speed only when the serving robot into which food is loaded passes by a table at which a customer is having a meal.

FIG. 5 shows an example in which a serving robot carrying food slows down the speed when it passes by a table at which a customer is having a meal. The serving robot may move at a normal speed when it finishes the delivery of the food.

Also, when a user requests a refill, the driving speed of the serving robot may be controlled depending on the type and number of dishes to be refilled. For example, when it carries food that is likely to spill, such as soup, the serving robot may be controlled to safely move by decreasing the speed.

Figure 6:
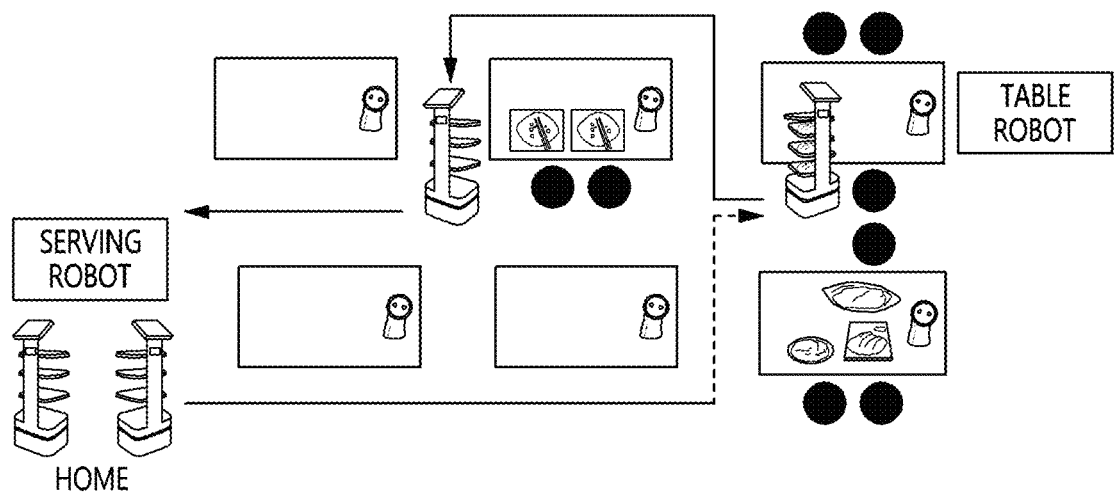
FIG. 6 illustrates a method for controlling driving of multiple serving robots according to an embodiment of the present disclosure.

FIG. 6 illustrates a method for controlling driving of multiple serving robots according to an embodiment of the present disclosure.

Generally in a restaurant domain, the number of serving robots for delivering food and clearing tables is less than the number of table robots installed in respective tables. Therefore, in order to provide efficient food delivery and table clearing services, a scenario for controlling multiple serving robots is required.

When a table requests a table clearing service (when a meal is finished), not a serving robot at a waiting position (HOME) but a robot moving around the corresponding table may provide the table clearing service. The case in which the robot that stands by at the waiting position does not provide a service as described above may occur only when the waiting position is far from the table requesting the service.

For example, when table clearing is requested by a table near a serving robot that returns to the waiting position after finishing the delivery, the path of the serving robot is reestablished such that it provides the table clearing service and then returns to the waiting position.

When finishing services, serving robots stand by at the waiting position, and when a service request is received from a user, a serving robot that is waiting first in line at the waiting position provides the service first according to First-In First-Out (FIFO). However, when there is no serving robot at the waiting position, a service completion time is estimated based on table status information, and the expected service available time may be announced to a user. Notifying the user of the expected service available time may be performed by a table robot.

Figure 7:
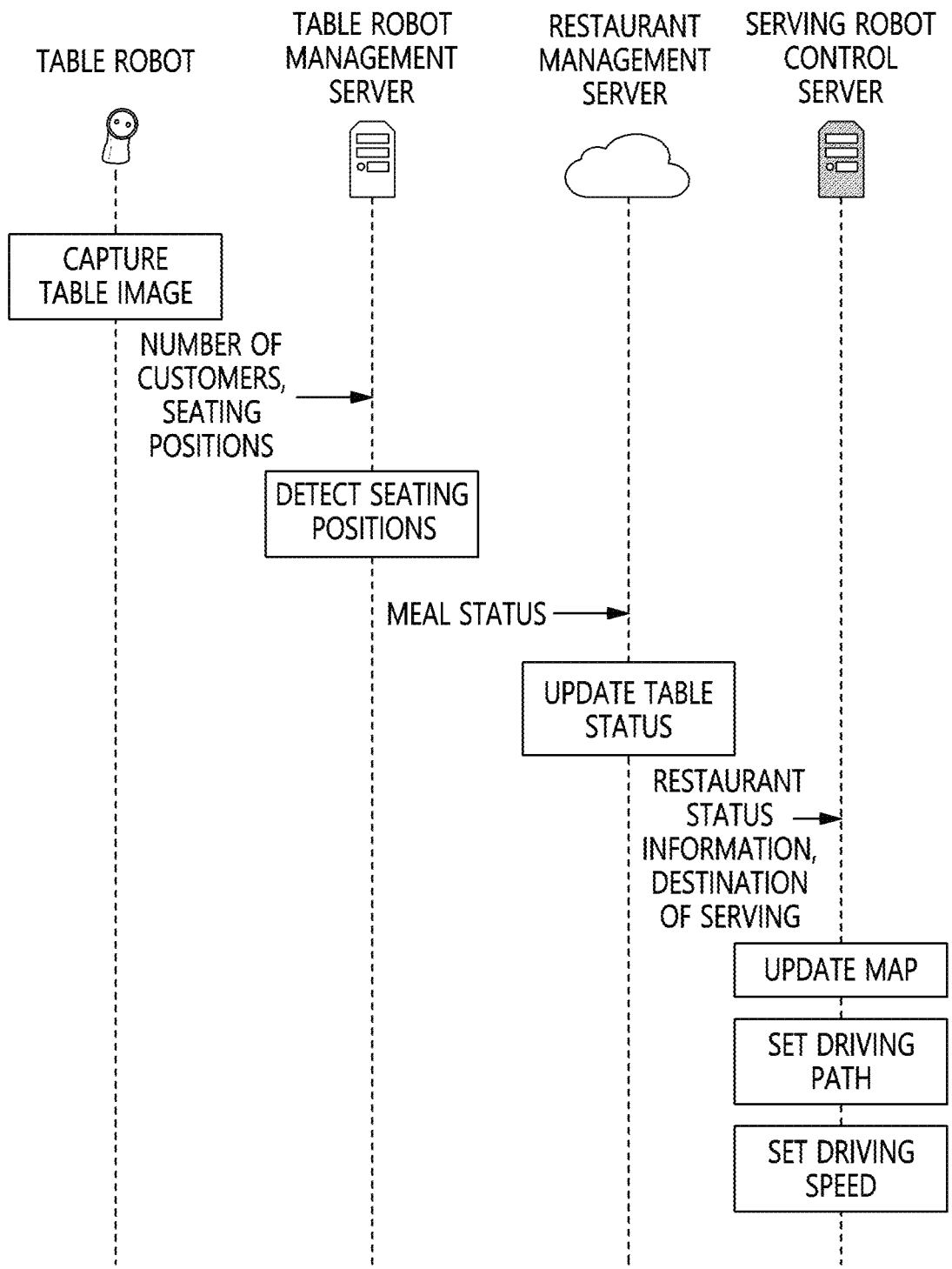
FIG. 7 is a diagram of a procedure for setting the driving path and speed of a serving robot.

FIG. 7 is a diagram of a procedure for setting the driving path and speed of a serving robot.

Referring to FIG. 7, a table robot may detect the number of customers and the seating positions of the customers by capturing a table image and transmit the same to a table robot management server. The table robot management server may detect the seating positions at each table and transmit meal status to a restaurant management server. The restaurant management server may update the current status of tables and transmit the overall restaurant status information and a destination of serving to a serving robot control server. The serving robot control server may update a restaurant navigation map and set a driving path and a driving speed.

Figure 8:
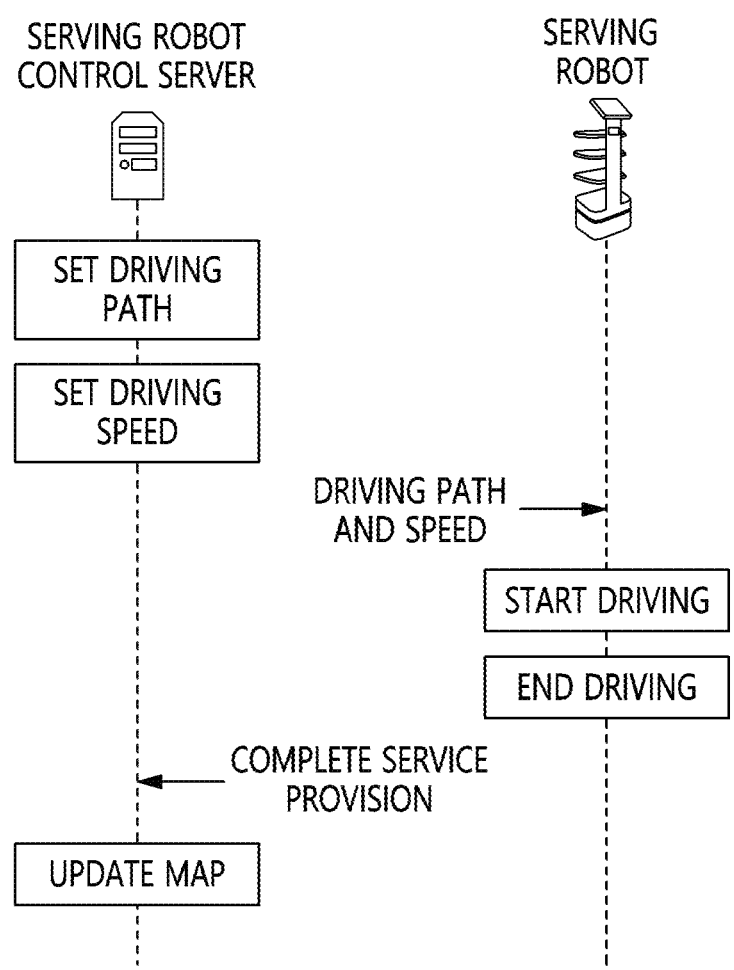
FIG. 8 is a diagram of a procedure for the start and end of driving of a serving robot.

FIG. 8 is a diagram of a procedure for the start and end of driving of a serving robot.

Referring to FIG. 8, a serving robot may start driving after receiving a driving path and speed information from a serving robot control server. When the driving of the serving robot is finished, a service provision completion message may be transmitted to the serving robot control server. The serving robot control server may update the restaurant navigation map based on the completion message.

Figure 9:
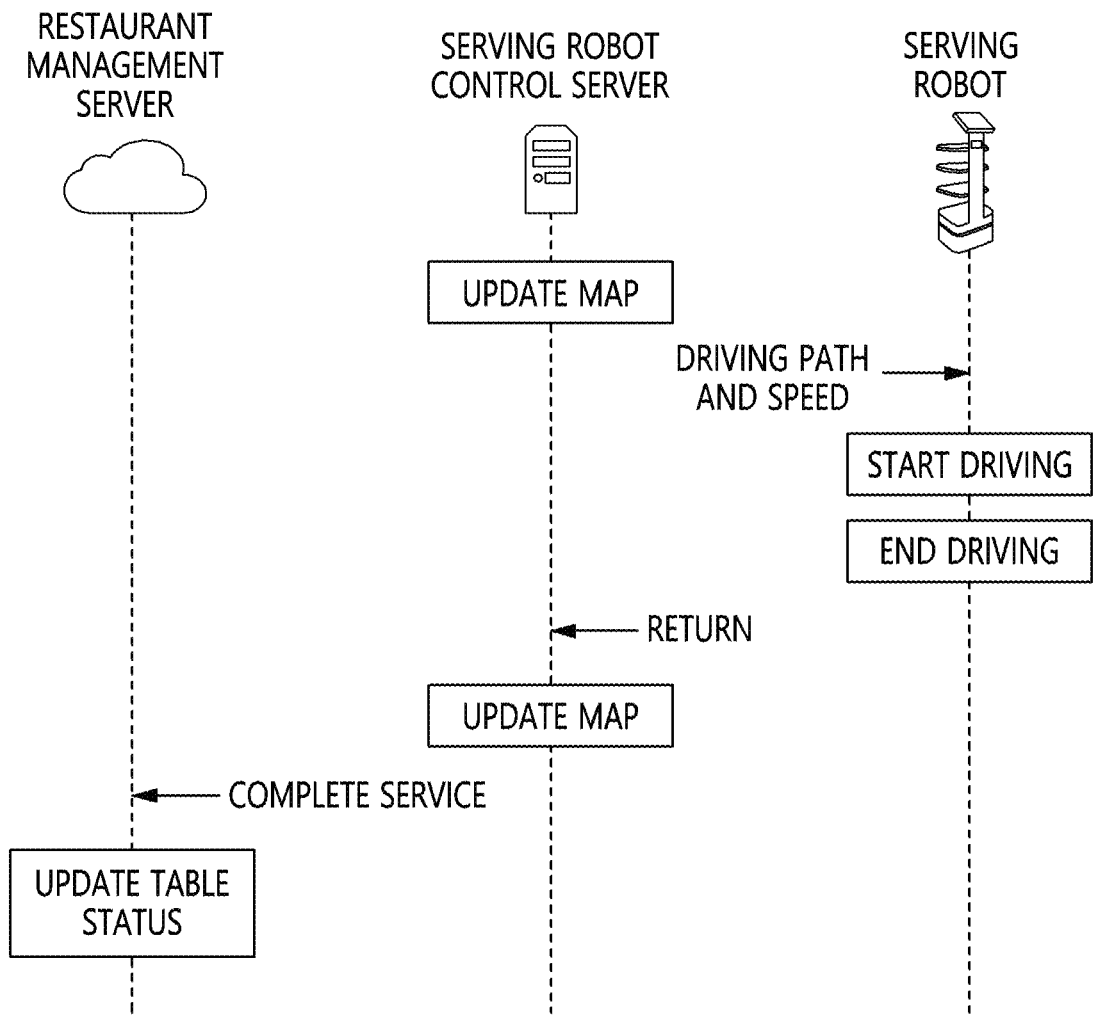
FIG. 9 is a diagram of a procedure of a service completion step of a serving robot.

FIG. 9 is a diagram of a procedure of a service completion step of a serving robot.

Referring to FIG. 9, when it receives a delivery completion message from a serving robot, a serving robot control server may update a map and transmit a driving path and speed information, which are necessary for the serving robot to return to a waiting position, to the serving robot. When it receives the driving path and the speed information, the serving robot starts driving based thereon, and when the driving is finished, the serving robot may transmit a driving completion message to the serving robot control server. The serving robot control server may update the map by receiving the message from the serving robot that returns to the waiting position, and may transmit a service completion message to a restaurant management server. When it receives the service completion message, the restaurant management server may update the current status of tables.

Figure 10:
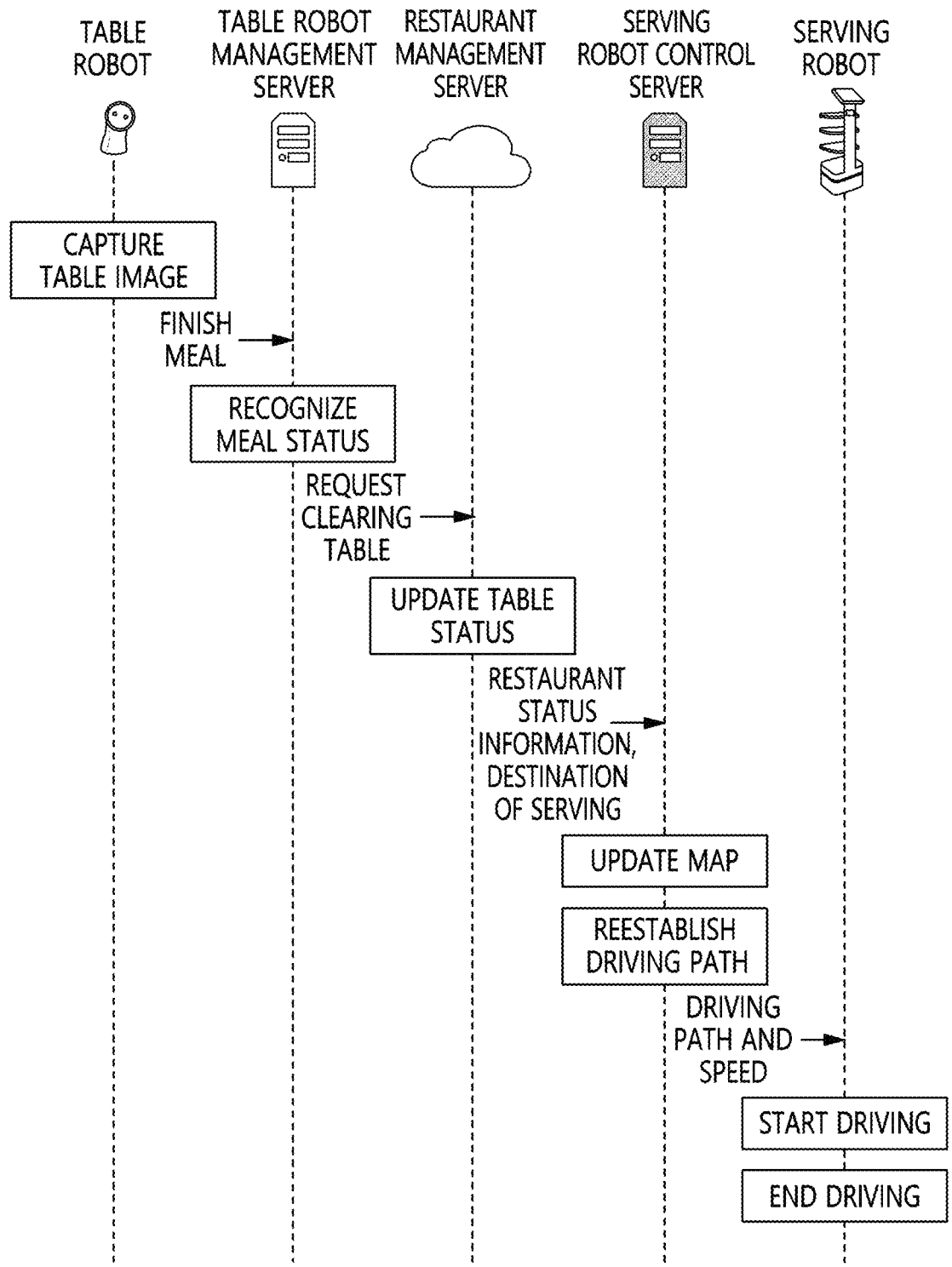
FIG. 10 is a diagram of a procedure for changing the driving path of a serving robot.

FIG. 10 is a diagram of a procedure for changing the driving path of a serving robot.

Referring to FIG. 10, when a table robot recognizes meal status by capturing a table image and receives a request for a table clearing service from a user, the table robot may transmit a meal finish message to a restaurant management server. The restaurant management server may update the current status of tables and transmit the location of the table requesting the table clearing service to a serving robot control server. The serving robot control server may update a map and detect the locations of serving robots, thereby reestablishing a driving path. The serving robot control server may select the serving robot most suitable to perform the table clearing service and transmit a message containing the driving path and speed information to the corresponding robot. The serving robot that receives the message starts and finish driving and completes the service.

Figure 11:
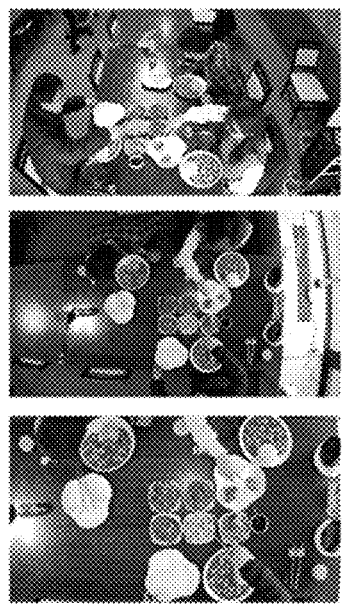
FIG. 11 is a concept diagram illustrating technology for understanding meal context according to an embodiment of the present disclosure.
Figure 11:
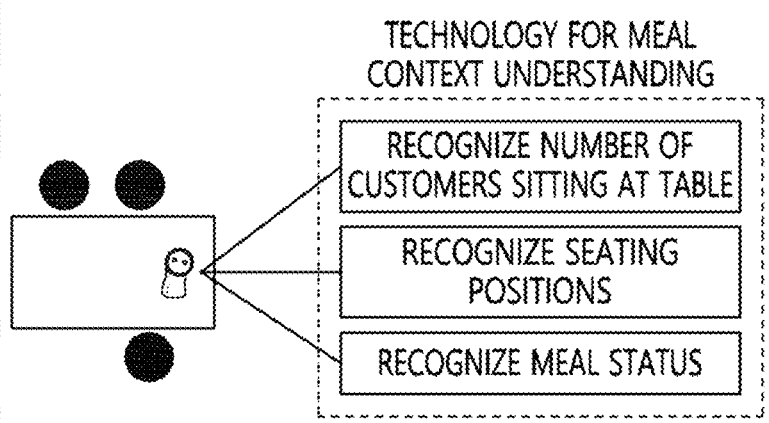

FIG. 11 is a concept diagram illustrating technology for understanding meal context according to an embodiment of the present disclosure.

Referring to FIG. 11, the technology for understanding meal context may include technology for recognizing the number of customers sitting at a table, recognizing the seating positions of the customers, and recognizing the meal status. As an input image of a table robot (a camera installed for capturing a table image), a top view image captured as viewed from a ceiling such that the table state can be seen well or a side view image captured from the side of the table may be used.

Here, in the technology for recognizing the number of customers sitting at the table and the seating positions of the customers, a table robot management server may obtain a recognition result by comparing situations before and after the customers sit at the table using the images input from the table robot and transmit the recognition result to a restaurant management server. However, recognizing the number of customers sitting at the table and the seating positions of the customers may be performed by the table robot itself, and the scope of the present disclosure is not limited thereto.

Figure 12:
FIG. 12 is an example of a screen for meal context understanding based on a table image.

FIG. 12 is an example of a screen for meal context understanding based on a table image.

In the technology for understanding meal context, meal status may be recognized by dividing the status into three stages, which are before a meal, during a meal, and the end of a meal. The meal status may be recognized by comprehensively considering the locations of utensils, the overall amount of food, the degree of movement of people, and the meal time, and the recognition may be performed using a pretrained AI neural network.

Figure 13:
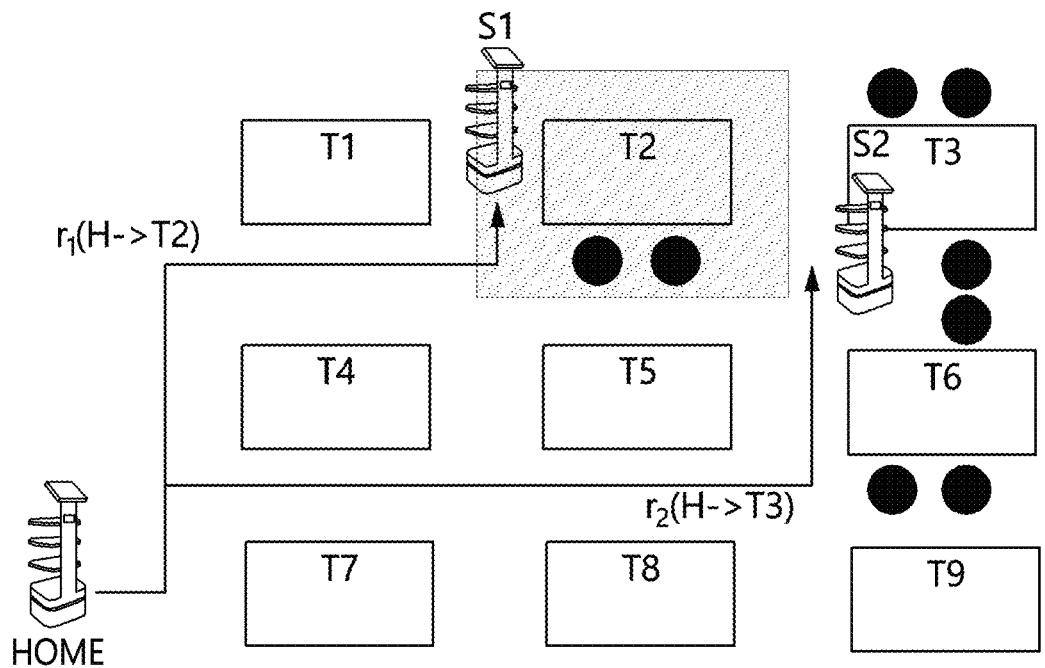
FIG. 13 is an example of a result of establishing a driving path of a serving robot.

FIG. 13 is an example of a result of establishing a driving path of a serving robot.

The driving path of a serving robot may be set to the shortest path by default. However, when multiple serving robots are present in a service domain, the driving path may be reestablished in consideration of the service provision status of each of the serving robots in order to avoid a collision between the serving robots.

The driving path $r_1$ (H→T2) of a serving robot S1 from a waiting position (HOME) to T2 may be set by calculating the shortest distance. Here, the driving path $r_2$ (H→T3) of a serving robot S2 from the waiting position (HOME) to T3 may be set by considering the shortest distance, but may be set to circumvent the area (shaded in gray) near the table T2 at which another serving robot in the restaurant is providing a service.

Figure 14:
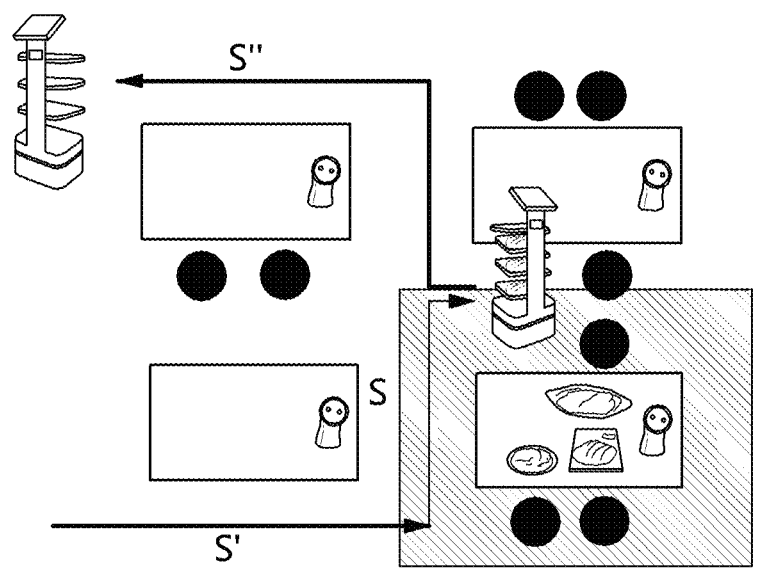
FIG. 14 is an example of a method for setting the driving speed of a serving robot.

FIG. 14 is an example of a method for setting the driving speed of a serving robot.

Referring to FIG. 14, the driving speed of a serving robot may be controlled depending on two factors. The first factor is whether a serving robot carries food. That is, when the serving robot delivers food, the driving speed of the serving robot may differ from the speed when it returns after the food delivery or provides a service for returning empty dishes. For example, assuming that the speed of the serving robot returning after food delivery is s'', s'' may be set higher than the speed of the serving robot carrying food (s and s' of FIG. 14).

The second factor is recognition of an obstacle on the driving path and the possibility that a hazard will occur. When a table where people having a meal is present on the driving path of a serving robot, one of them may suddenly stand up and collide with the serving robot moving along the driving path. Therefore, when the serving robot passes by the corresponding table (the section marked with diagonal lines), it may move at a speed lower than the current speed. For example, when the speed of the serving robot carrying food in a normal driving section is s' and when the speed of the serving robot passing by the table at which people are having a meal is s, s may be set lower than s'. For example, the speeds of the serving robot may be set to s''>s'>s.

Figure 15:
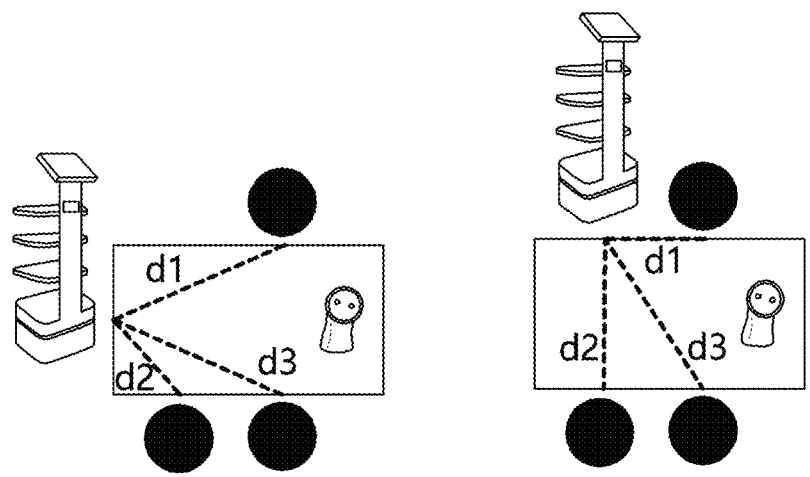
FIG. 15 is an example of setting the arrival point of a serving robot.

FIG. 15 is an example of setting the arrival point of a serving robot.

The method of setting an arrival point according to an embodiment of the present disclosure is technology for setting the arrival point of a serving robot to different points depending on the seating position of a customer, unlike a preset point such as a waiting position. The distance (d) from the expected arrival point of the serving robot to each customer is estimated, and the point at which the sum of the distances to all of the customers (d1+d2+d3) is minimized may be set as the arrival point of the serving robot.

Figure 16:
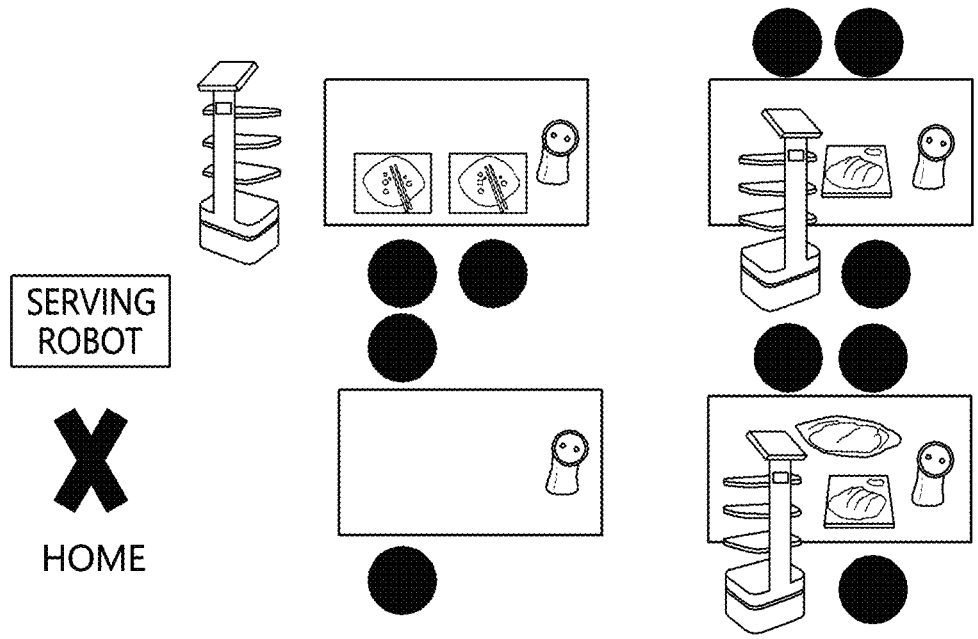
FIG. 16 is an example illustrating the status of tables at a specific time in a service domain.

FIG. 16 is an example illustrating the table status at a specific time in a service domain.

Figures 17, 18:
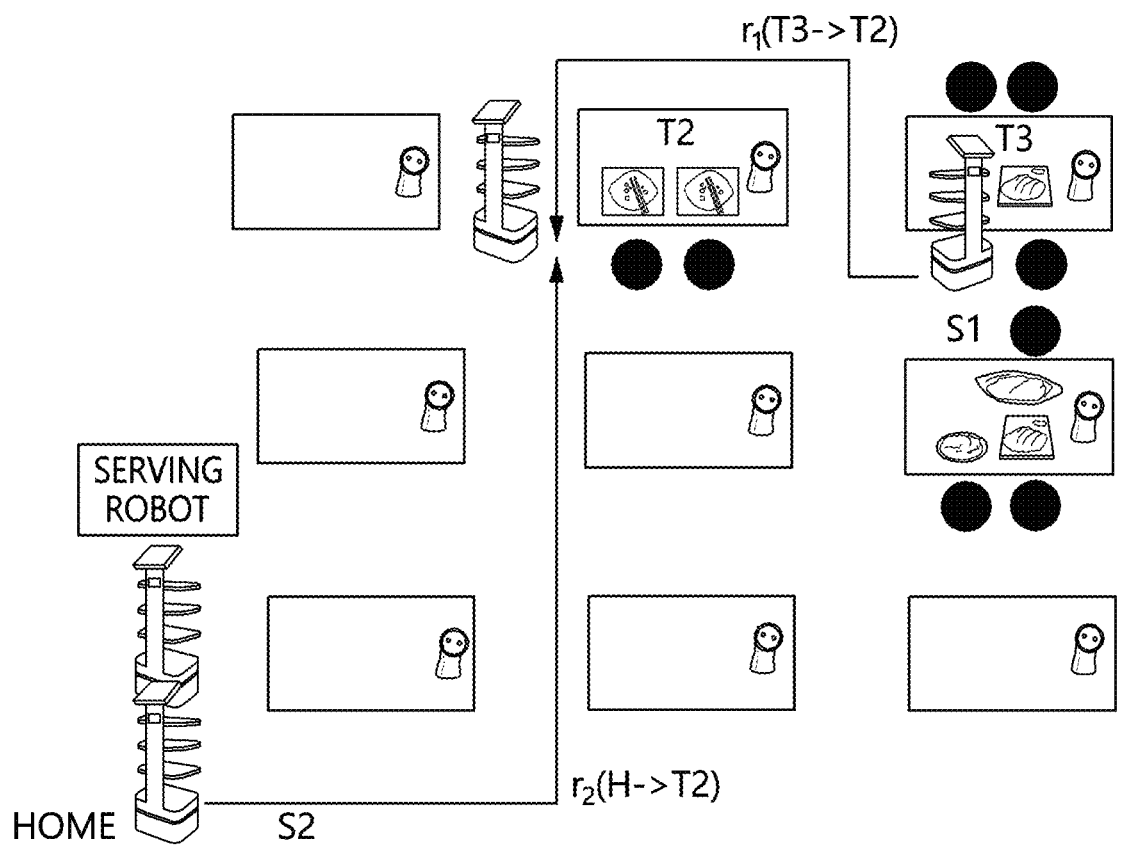
FIG. 17 is a table illustrating information about the current status of tables for the situation of FIG. 16.
FIG. 18 is an example illustrating a process of assigning a table clearing service to a serving robot.

FIG. 17 is a table illustrating information about the current status of tables for the situation of FIG. 16.

FIG. 18 is an example illustrating a process of assigning a table clearing service to a serving robot.

Generally, if a departure point and an arrival point are fixed, a robot moves along a consistent driving path when it goes and returns. In the present disclosure, when a serving robot goes and returns, a suitable driving path, rather than the consistent driving path, may be set using information about the current status of tables based on meal context understanding technology, and the serving robot may provide a service at a table.

According to First-In First Out (FIFO), a serving robot that is waiting first in line at a waiting position may provide a service first. However, a serving robot that stands by at the waiting position in order to provide a service is not present, a service completion time is estimated from the information about the current status of tables, and the expected service available time may be announced to a user.

When information indicating the end of a meal and a request for a table clearing service are received from a table robot, serving robots capable of providing the table clearing service at the corresponding table may be searched for, and the locations thereof may be detected. Then, the driving paths from the serving robots capable of providing the service to the table requesting the service may be calculated. Using the calculated driving paths, a serving robot corresponding to the shortest distance is selected, and a service instruction may be given to the selected serving robot.

For example, when a request for a table clearing service is made by a table robot on a table T2, as shown in FIG. 18, serving robots capable of providing the table clearing service to the table T2 are searched for, and driving paths to the table T2 are calculated. Among the serving robots capable of providing the table clearing service, a serving robot S1 that is located at the shortest distance from the table T2 is selected, and the service may be assigned thereto.

Figure 19:
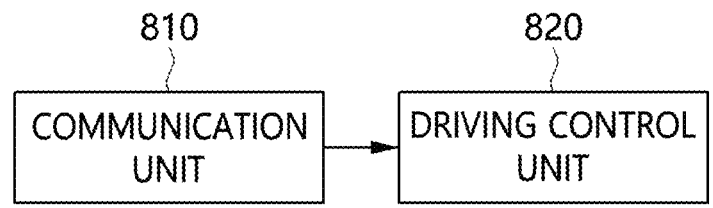
FIG. 19 is a block diagram illustrating an apparatus for controlling a serving robot based on meal context according to an embodiment of the present disclosure.

FIG. 19 is a block diagram illustrating an apparatus for controlling a serving robot based on meal context according to an embodiment of the present disclosure.

The apparatus for controlling a serving robot based on meal context according to an embodiment of the present disclosure includes a communication unit 810 for receiving table information from a table robot corresponding to each table in a service area and a driving control unit 820 for controlling driving of a serving robot using the meal context and a navigation map, and the meal context includes information about the seating positions of customers and meal status information corresponding to the table.

Here, the meal status information may be classified into before a meal, during a meal, and the end of a meal.

Here, the driving control unit 820 may control the serving robot at a second driving speed near the seating positions of the customers using the information about the seating positions, the second driving speed being lower than an existing first driving speed.

Here, the driving control unit 820 may control the serving robot at a fourth driving speed lower than an existing third driving speed when the serving robot carries food.

Here, when it receives a request for a table clearing service from a table at which a meal is finished, the driving control unit 820 may control a serving robot located within a preset distance from the table requesting the table clearing service to provide the table clearing service when the distance between a serving robot waiting position in the service area and the table requesting the table clearing service is greater than a threshold.

Here, the driving control unit 820 may set the driving path to circumvent a table at which another serving robot is providing a service.

Here, the driving control unit 820 may set the arrival point of the serving robot in consideration of information about the seating positions of the customers.

Here, the driving control unit 820 may calculate an estimated time of a service for a table in the service area using the meal status information.

Here, the driving control unit 820 may calculate the estimated service completion time of the serving robot and schedule the serving robot using the estimated service completion time of the serving robot and the estimated time of a service for the table in the service area.

Figure 20:
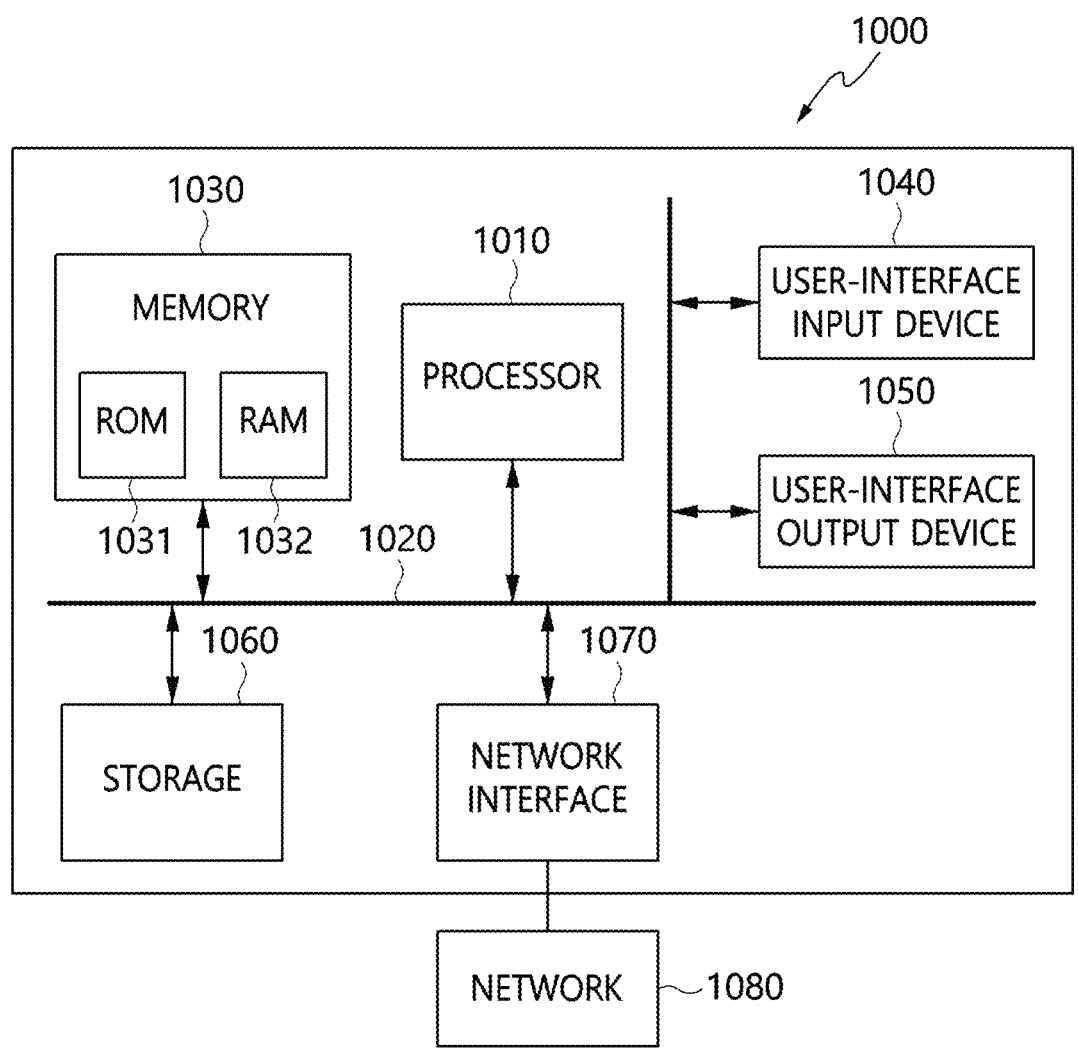
FIG. 20 is a view illustrating the configuration of a computer system according to an embodiment.

FIG. 20 is a view illustrating the configuration of a computer system according to an embodiment.

The apparatus for controlling a serving robot based on meal context according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected with a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

According to the present disclosure, a serving robot may be controlled using information acquired from a table robot.

Also, the present disclosure may control the driving path and speed of a serving robot and calculate an estimated service time using information about the seating of customers, meal context information, and the like acquired from a table robot.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. A method for controlling driving of a serving robot based on meal context, comprising:
   receiving table information from a table robot corresponding to a table in a service area; and
   controlling driving of the serving robot using the meal context and a navigation map,
   wherein the meal context includes information about a seating position of a customer and meal status information corresponding to the table,
   wherein controlling the driving of the serving robot comprises, when a request for a table clearing service is received from the table at which a meal is finished, re-establishing a driving path of the serving robot that is returning to a serving robot waiting position after completing a delivery, such that the serving robot is controlled to provide the table clearing service to the table before returning to the serving robot waiting position, when the serving robot is located within a preset distance from the table and when a distance between the serving robot waiting position and the table is greater than a threshold.

2. The method of claim 1, wherein the meal status information is classified into before a meal, during a meal, and an end of a meal.

3. The method of claim 2, wherein controlling the driving of the serving robot comprises controlling the serving robot at a second driving speed near the seating position of the customer using the information about the seating position, the second driving speed being lower than an existing first driving speed.

4. The method of claim 3, wherein controlling the driving of the serving robot comprises controlling the serving robot at a fourth driving speed lower than an existing third driving speed when the serving robot carries food.

5. The method of claim 2, wherein controlling the driving of the serving robot comprises setting a driving path to circumvent a table at which another serving robot is providing a service.

6. The method of claim 2, wherein controlling the driving of the serving robot comprises setting an arrival point of the serving robot in consideration of the information about the seating position of the customer.

7. The method of claim 2, wherein controlling the driving of the serving robot includes calculating an estimated time of a service for a table in the service area using the meal status information.

8. The method of claim 7, wherein controlling the driving of the serving robot comprises calculating an estimated service completion time of the serving robot and scheduling the serving robot using the estimated service completion time of the serving robot and the estimated time of the service for the table in the service area.

9. An apparatus for controlling driving of a serving robot based on meal context, comprising:
   a network interface for receiving table information from a table robot corresponding to a table in a service area; and
   a driving control unit for controlling driving of the serving robot using the meal context and a navigation map,
   wherein the meal context includes information about a seating position of a customer and meal status information corresponding to the table,
   wherein, when a request for a table clearing service is received from the table at which a meal is finished, the driving control unit re-establishes a driving path of the serving robot that is returning to a serving robot waiting position after completing a delivery, to control the serving robot to provide the table clearing service to the table before returning to the serving robot waiting position, when the serving robot is located within a preset distance from the table and when a distance between the serving robot waiting position and the table is greater than a threshold.

10. The apparatus of claim 9, wherein the meal status information is classified into before a meal, during a meal, and an end of a meal.

11. The apparatus of claim 10, wherein the driving control unit controls the serving robot at a second driving speed near the seating position of the customer using the information about the seating position, the second driving speed being lower than an existing first driving speed.

12. The apparatus of claim 11, wherein the driving control unit controls the serving robot at a fourth driving speed lower than an existing third driving speed when the serving robot carries food.

13. The apparatus of claim 10, wherein the driving control unit sets a driving path to circumvent a table at which another serving robot is providing a service.

14. The apparatus of claim 10, wherein the driving control unit sets an arrival point of the serving robot in consideration of the information about the seating position of the customer.

15. The apparatus of claim 10, wherein the driving control unit calculates an estimated time of a service for a table in the service area using the meal status information.

16. The apparatus of claim 15, wherein the driving control unit calculates an estimated service completion time of the serving robot and schedules the serving robot using the estimated service completion time of the serving robot and the estimated time of the service for the table in the service area.

\* \* \* \* \*